(12) United States Patent
Scheuerman et al.

(10) Patent No.: US 9,988,110 B2
(45) Date of Patent: Jun. 5, 2018

(54) GUIDE RAIL FOR CRAWLER TRACK

(71) Applicant: Harnischfeger Technologies, Inc., Wilmington, DE (US)

(72) Inventors: Adam Scheuerman, Waukesha, WI (US); Joseph Brenny, Hartland, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 0 days. days.

(21) Appl. No.: 15/691,181

(22) Filed: Aug. 30, 2017

(65) Prior Publication Data

US 2017/0361883 A1    Dec. 21, 2017

Related U.S. Application Data

(63) Continuation of application No. 14/538,531, filed on Nov. 11, 2014, now Pat. No. 9,776,676.
(Continued)

(51) Int. Cl.
*B62D 55/084* (2006.01)
*B62D 55/10* (2006.01)
(Continued)

(52) U.S. Cl.
CPC ........... *B62D 55/10* (2013.01); *B62D 55/092* (2013.01); *B62D 55/15* (2013.01); *B62D 55/202* (2013.01); *B62D 55/26* (2013.01)

(58) Field of Classification Search
CPC .......................... B62D 55/205; B62D 55/202; B62D 55/0847; B62D 55/15
(Continued)

(56) References Cited

U.S. PATENT DOCUMENTS 2,452,921 A    11/1948    Gillespie
3,053,579 A     9/1962    Trudeau
(Continued)

FOREIGN PATENT DOCUMENTS

AU    2003100265    8/2003
CL    2014001364    2/2015
(Continued)

OTHER PUBLICATIONS

First Office Action from the State Intellectual Property Office of China for Application No. 201410645374.9 dated Nov. 6, 2017 (17 pages with English Translation).
(Continued)

*Primary Examiner* — Jeffrey J Restifo
(74) *Attorney, Agent, or Firm* — Michael Best & Friedrich LLP (57) ABSTRACT

A crawler mechanism includes a frame, a track including a plurality of shoes coupled together and supported for movement relative to the frame along a direction of travel, a sprocket, and a guide rail. The frame includes a first end, a second end, a first side extending between the first end and the second end and proximate a support surface, and a second side. Each shoe includes an intermediate portion having a first hardness. The sprocket drives the plurality of shoes to move along the second side of the frame. The guide rail is coupled to the second side of the frame and includes a base having an outer surface and a coating bonded to the outer surface. The coating contacts the intermediate portion of the shoes as the shoes move along the second side of the frame, and the coating defines a second hardness less than the first hardness.

19 Claims, 9 Drawing Sheets

Related U.S. Application Data (60) Provisional application No. 61/903,065, filed on Nov. 12, 2013.

(51) Int. Cl.
  *B62D 55/092*   (2006.01)
  *B62D 55/26*   (2006.01)
  *B62D 55/20*   (2006.01)
  *B62D 55/15*   (2006.01)

(58) Field of Classification Search
  USPC .................. 305/116, 127, 160, 198, 201
  See application file for complete search history.

(56) References Cited

U.S. PATENT DOCUMENTS

| | | | |
|---|---|---|---|
| 3,128,130 A | 4/1964 | Harris | |
| 3,165,364 A | 1/1965 | Hardman et al. | |
| 3,307,882 A | 3/1967 | McFayden | |
| 3,601,212 A | 8/1971 | Peterson et al. | |
| 3,680,928 A | 8/1972 | Kraschnewski et al. | |
| 3,721,476 A | 3/1973 | Andersson | |
| 3,913,986 A | 10/1975 | Schaffner | |
| 4,097,093 A * | 6/1978 | Shelby | B62D 55/08 305/125 |
| 4,139,240 A | 2/1979 | Profio et al. | |
| 4,175,797 A | 11/1979 | Krekeler | |
| 4,176,887 A * | 12/1979 | Alpers | B62D 55/08 305/106 |
| 4,262,972 A | 4/1981 | Falk | |
| 4,278,301 A | 7/1981 | Gregor et al. | |
| 4,391,341 A * | 7/1983 | Taghon | B62D 55/10 180/9.1 |
| 4,425,007 A | 1/1984 | Soeteber | |
| 4,572,588 A | 2/1986 | Wiesner et al. | |
| 4,583,791 A * | 4/1986 | Nagata | B62D 55/08 305/134 |
| 4,583,792 A | 4/1986 | Erlenmaier et al. | |
| 4,636,014 A | 1/1987 | Dennison et al. | |
| 4,673,050 A | 6/1987 | Zschocke | |
| 4,735,465 A | 4/1988 | Wiesner et al. | |
| 4,805,968 A | 2/1989 | Connerley | |
| 5,072,800 A | 12/1991 | Price | |
| 5,853,233 A | 12/1998 | Turner | |
| 5,941,326 A * | 8/1999 | Fleuchaus | B62D 55/0847 180/9.1 |
| 6,012,848 A * | 1/2000 | Michioka | F16C 29/0602 384/43 |
| 6,017,103 A | 1/2000 | Villard | |
| 6,543,863 B1 | 4/2003 | Hannan et al. | |
| D484,149 S | 12/2003 | Hannan et al. | |
| 6,659,573 B1 | 12/2003 | Knecht et al. | |
| 6,702,406 B2 * | 3/2004 | Yoshida | B62D 55/088 305/100 |
| D496,051 S | 9/2004 | Yoshida | |
| 6,820,948 B2 | 11/2004 | Katoh | |
| 6,929,335 B2 * | 8/2005 | Colwell | B62D 55/14 305/194 |
| 7,040,080 B2 * | 5/2006 | Okawa | B21J 5/00 148/649 |
| 7,066,562 B2 * | 6/2006 | Rasmussen | B62D 55/26 29/891.1 |
| 7,219,968 B2 * | 5/2007 | Hisamatsu | B62D 55/21 305/195 |
| 7,410,225 B1 * | 8/2008 | Marzetta | A63H 17/14 305/159 |
| D588,167 S | 3/2009 | Shimozono | |
| D588,168 S | 3/2009 | Shimozono | |
| 7,530,650 B2 | 5/2009 | Hannan et al. | |
| 7,703,863 B2 | 4/2010 | Koolhiran | |
| D618,255 S | 6/2010 | Abiko | |
| 7,854,483 B2 | 12/2010 | Bordini | |
| 7,866,767 B2 | 1/2011 | Lemaire et al. | |
| D655,724 S | 3/2012 | Shimozono | |
| 8,272,701 B2 | 9/2012 | Mulligan | |
| 8,562,081 B2 * | 10/2013 | Sturmon | B62D 55/211 305/189 |
| 8,876,227 B2 * | 11/2014 | Meyer | B62D 55/28 305/191 |
| 9,174,293 B2 * | 11/2015 | Meyer | B23K 9/042 |
| D748,153 S | 1/2016 | Colwell et al. | |
| 9,290,217 B2 * | 3/2016 | Steiner | B62D 55/202 |
| 9,719,158 B2 * | 8/2017 | Westoby | B62D 55/14 |
| 9,738,334 B2 * | 8/2017 | Talbot | B62D 55/202 |
| 9,776,676 B2 * | 10/2017 | Scheuerman | B62D 55/10 |
| 2001/0054844 A1 * | 12/2001 | Rutz | B62D 55/0847 305/116 |
| 2003/0141760 A1 | 7/2003 | Yamamoto | |
| 2005/0151421 A1 | 7/2005 | Colwell et al. | |
| 2006/0181151 A1 * | 8/2006 | Wodrich | B62D 55/15 305/201 |
| 2010/0051358 A1 * | 3/2010 | Inaoka | B62D 55/088 180/9.1 |
| 2011/0048817 A1 * | 3/2011 | Bessette | B62D 55/084 180/9.62 |
| 2011/0221266 A1 | 9/2011 | Bonnetain et al. | |
| 2013/0092459 A1 | 4/2013 | Wodrich et al. | |
| 2013/0313891 A1 | 11/2013 | O'Neill | |
| 2014/0346856 A1 * | 11/2014 | Colwell | B62D 55/26 305/185 |
| 2015/0130268 A1 * | 5/2015 | Scheuerman | B62D 55/15 305/116 |
| 2015/0158536 A1 * | 6/2015 | Takagi | B62D 55/12 305/201 |
| 2015/0197294 A1 * | 7/2015 | Hakes | B62D 55/202 305/142 |

FOREIGN PATENT DOCUMENTS

| | | |
|---|---|---|
| CN | 1218727 | 6/1999 |
| CN | 1289296 | 3/2001 |
| CN | 1309049 | 8/2001 |
| CN | 1817716 | 8/2006 |
| CN | 2900299 | 5/2007 |
| CN | 101421150 | 4/2009 |
| CN | 101513901 | 8/2009 |
| DE | 3629613 | 3/1988 |
| EP | 0115570 | 8/1984 |
| JP | 3106814 | 11/2000 |
| JP | 2014028556 | 2/2014 |
| WO | WO2014027530 | 2/2014 |

OTHER PUBLICATIONS

Second Office Action from the Chilean Patent Office for Application No. 2014-001364 first known to us Nov. 21, 2017 dated Oct. 20, 2017 (10 pages, which includes a Statement of Relevance).

Second Office Action from the State Intellectual Property Office of China for Application No. 201410224901.9 dated Dec. 19, 2017 (16 pages with English Translation).

First Office Action from the State Intellectual Property Office of China for Application No. 201410224901.9 dated Apr. 28, 2017 (13 pages).

* cited by examiner

GUIDE RAIL FOR CRAWLER TRACK

CROSS-REFERENCE TO RELATED APPLICATIONS

The present application is a continuation of co-pending, prior-filed U.S. patent application Ser. No. 14/538,531, filed Nov. 11, 2014, which claims the benefit of U.S. Provisional Application Ser. No. 61/903,065, filed Nov. 12, 2013. The entire contents of these documents are incorporated herein by reference.

BACKGROUND

The present invention relates to industrial machines and, in particular, to a guide rail for a crawler of a mining machine.

Conventional earth-moving machines, such as mining shovels and excavators, include crawler mechanisms for moving the machine over the ground. The crawler mechanism includes an articulated track composed of multiple links or shoes coupled together to form a continuous loop. The shoes engage the ground and engage a row of rollers along a roller path as the track is driven. The weight of the machine and any loads supported by the machine are transmitted through the rollers to the shoes, thereby causing the shoes to wear down and/or deform over time.

SUMMARY

In one aspect, a crawler mechanism includes a frame, a track including a plurality of shoes coupled together and supported for movement relative to the frame along a direction of travel, a sprocket, and a guide rail. The frame includes a first end, a second end, a first side extending between the first end and the second end and proximate a support surface, and a second side. Each shoe includes a first end, a second end, and an intermediate portion positioned between the first end and the second end, the intermediate portion having a first hardness. The sprocket is rotatably coupled to the first end of the frame and drives the plurality of shoes to move along the second side of the frame. The guide rail is coupled to the second side of the frame and includes a base having an outer surface and a coating bonded to the outer surface. The coating contacts the intermediate portion of the shoes as the shoes move along the second side of the frame, and the coating has a second hardness less than the first hardness.

In another aspect, a crawler mechanism includes a frame, a first sprocket supported for rotation relative to the frame, a second sprocket, a plurality of rollers rotatably coupled to a lower portion of the frame, a track including a plurality of shoes coupled together, and a guide rail assembly. The frame includes a first end and a second end. The second sprocket is rotatably coupled to the second end of the frame. The rollers are aligned with one another such that all of the rollers rotate in a common plane. The track is driven by at least one of the first sprocket and the second sprocket for movement in a direction parallel to the common plane of the rollers. The track defines an upper run and a lower run, and the lower run is positioned adjacent the rollers. Each shoe includes a wear portion contacting the rollers as the shoe moves along the lower run. The guide rail assembly is coupled to the frame and positioned adjacent the upper run of the track. The guide rail assembly includes a base having an outer surface and a coating bonded to the outer surface. The coating engages the wear portion of each shoe as the shoe moves along the upper run.

In yet another aspect, a frame for a crawler mechanism includes a first end supporting a first sprocket for driving a continuous track, a second end supporting a second sprocket, a first side, and a guide rail assembly. The first side extends between the first end and the second end and is positioned proximate a support surface. The first side includes a plurality of rollers supported for rotation, and the rollers are aligned with one another such that all of the rollers rotate in a common plane extending between the first end and the second end. The guide rail assembly defines a second side extending at least partially between the first sprocket and the second sprocket, and the guide rail assembly includes a base having an outer surface and a coating bonded to the outer surface.

Other independent aspects of the invention will become apparent by consideration of the detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
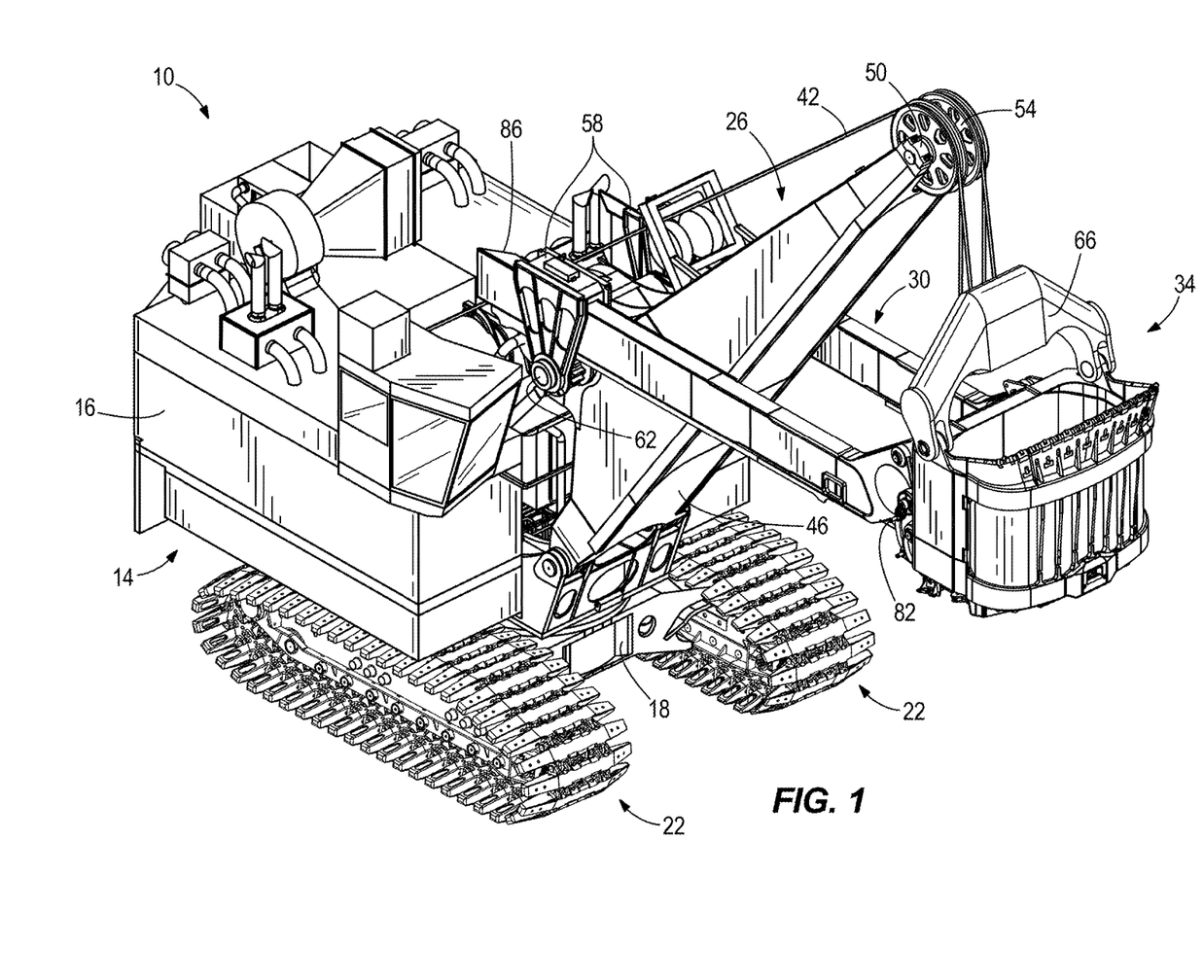
FIG. 1 is a perspective view of a mining shovel.

FIG. 1 illustrates an earthmoving machine, such as a mining shovel 10, including a frame 14 supporting a boom 26, an elongated member or handle 30, and an attachment or dipper 34 coupled to the handle 30. The frame 14 includes an upper portion 16 that is supported by an undercarriage 18 having crawlers 22. The upper portion 16 supports a hoist drum (not shown) for reeling in and paying out a cable or hoist rope 42. The boom 26 includes a first end 46 coupled to the upper portion 16 of the frame 14, a second end 50 opposite the first end 46, a boom sheave 54, a saddle block 58, and a shipper shaft 62. The boom sheave 54 is coupled to the second end 50 of the boom 26 and guides the rope 42 over the second end 50. The saddle block 58 is rotatably coupled to the boom 26 by the shipper shaft 62, which is positioned between the first end 46 and the second end 50 of the boom 26. The shipper shaft 62 extends through the boom 26 in a direction that is transverse to a longitudinal axis of the boom 26. The hoist rope 42 is coupled to the dipper 34 by a bail 66, and the dipper 34 is raised or lowered as the hoist rope 42 is reeled in or paid out, respectively, by the hoist drum.

The handle 30 includes a first end 82 and a second end 86. The second end 86 is movably received in the saddle block 58, and the handle 30 passes through the saddle block 58 such that the handle 30 is capable of rotational and translational movement relative to the boom 26. The saddle block 58 is rotatable relative to the boom 26 about the shipper shaft 62, and the handle 30 rotates relative to the boom 26 while the handle 30 remains in the saddle block 58.

Figure 2:
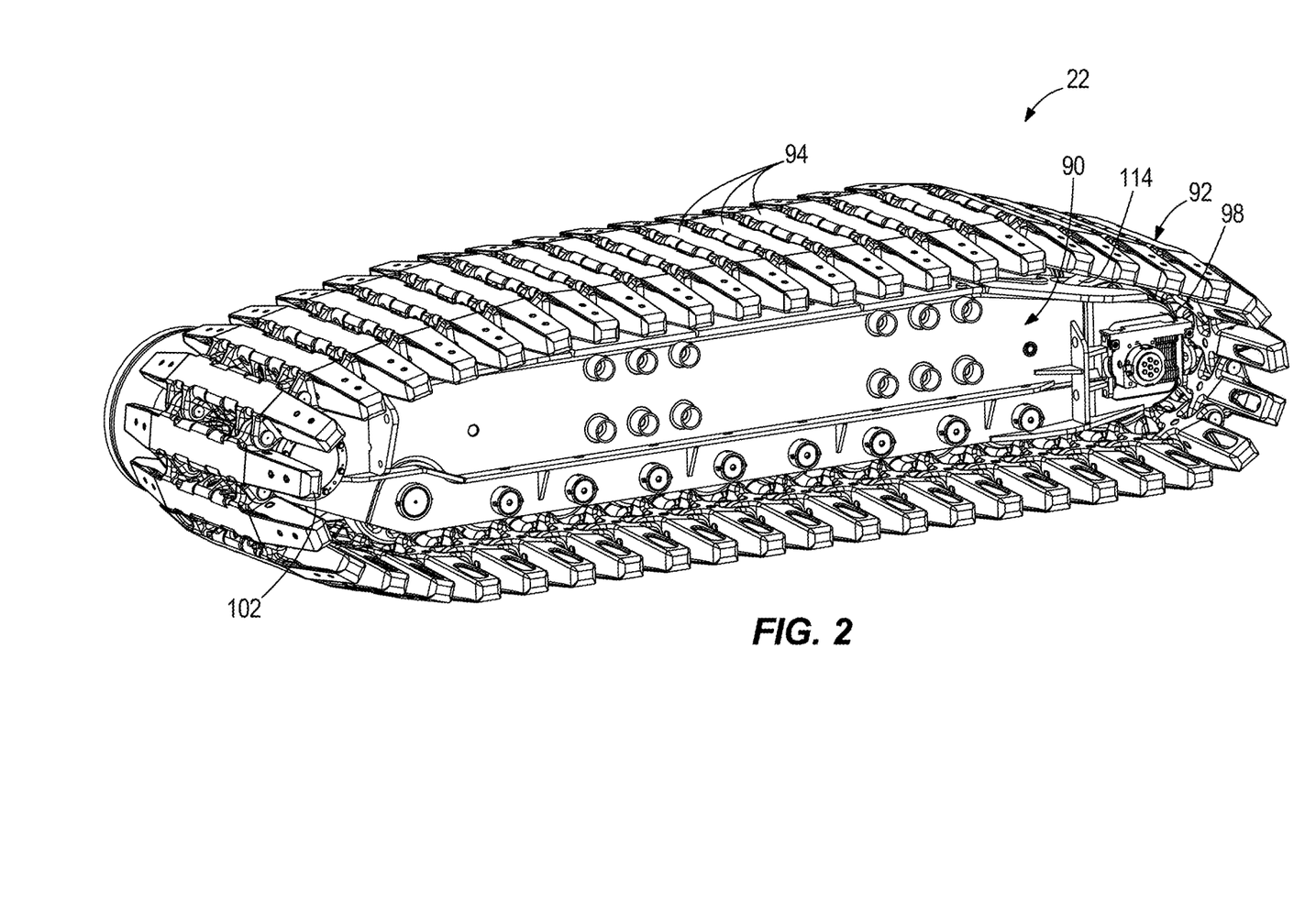
FIG. 2 is a perspective view of a crawler.
Figure 3:
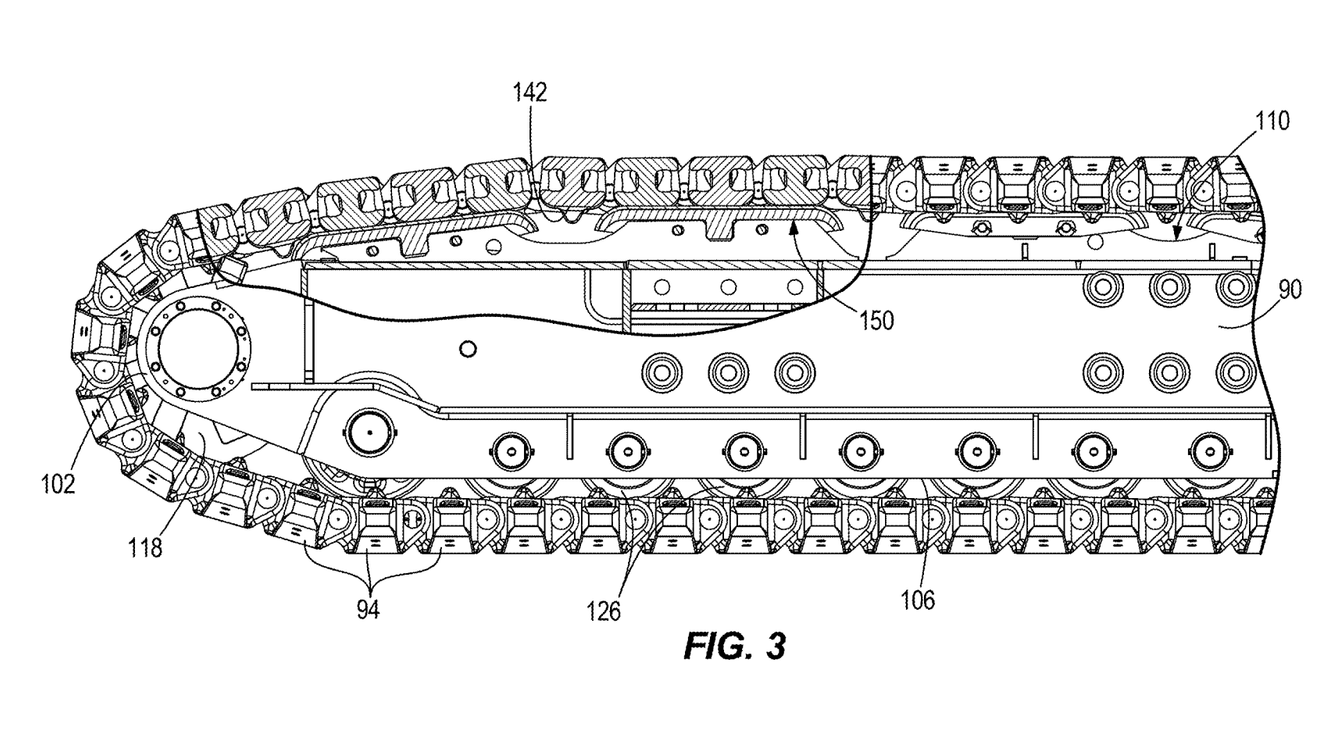
FIG. 3 is a side view of a portion of the crawler of FIG. 2.

As shown in FIGS. 2 and 3, each crawler 22 includes a track frame 90 and a track 92 including links or shoes 94 coupled together to form an articulated, continuous loop. The track frame 90 includes a first end 98, a second end 102, a first or lower portion 106, and a second or upper portion 110. In the illustrated embodiment, a first sprocket 114 (FIG. 2) is supported for rotation at the first end 98, and a second sprocket 118 (FIG. 3) is supported for rotation at the second end 102 of the frame 90. At least one of the sprockets 114, 118 is driven by a motor (not shown). The sprockets 114, 118 engage the crawler shoes 94 (e.g., by teeth extending into spaces between the shoes 94), thereby driving the shoes 94 around the perimeter of the track frame 90 in a continuous loop. The track 92 defines a first or lower run proximate the ground and a second or upper run extending along the upper portion 110 of the frame 90. As the shoes 94 move along the lower run, the shoes 94 engage the ground to move the machine 10 with respect to the ground.

Figure 4:
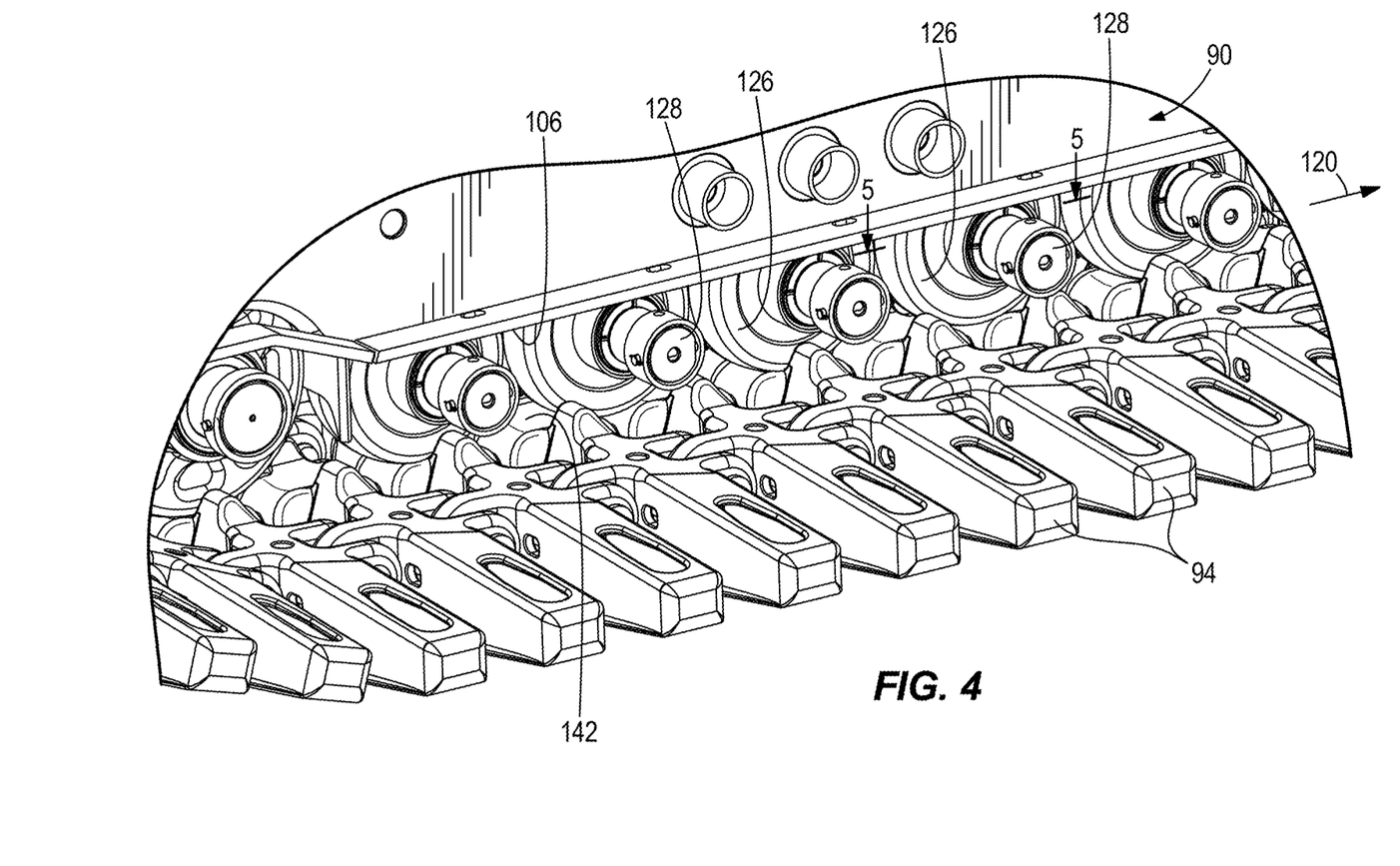
FIG. 4 is an enlarged perspective view of a portion of the crawler of FIG. 2.
Figure 5:
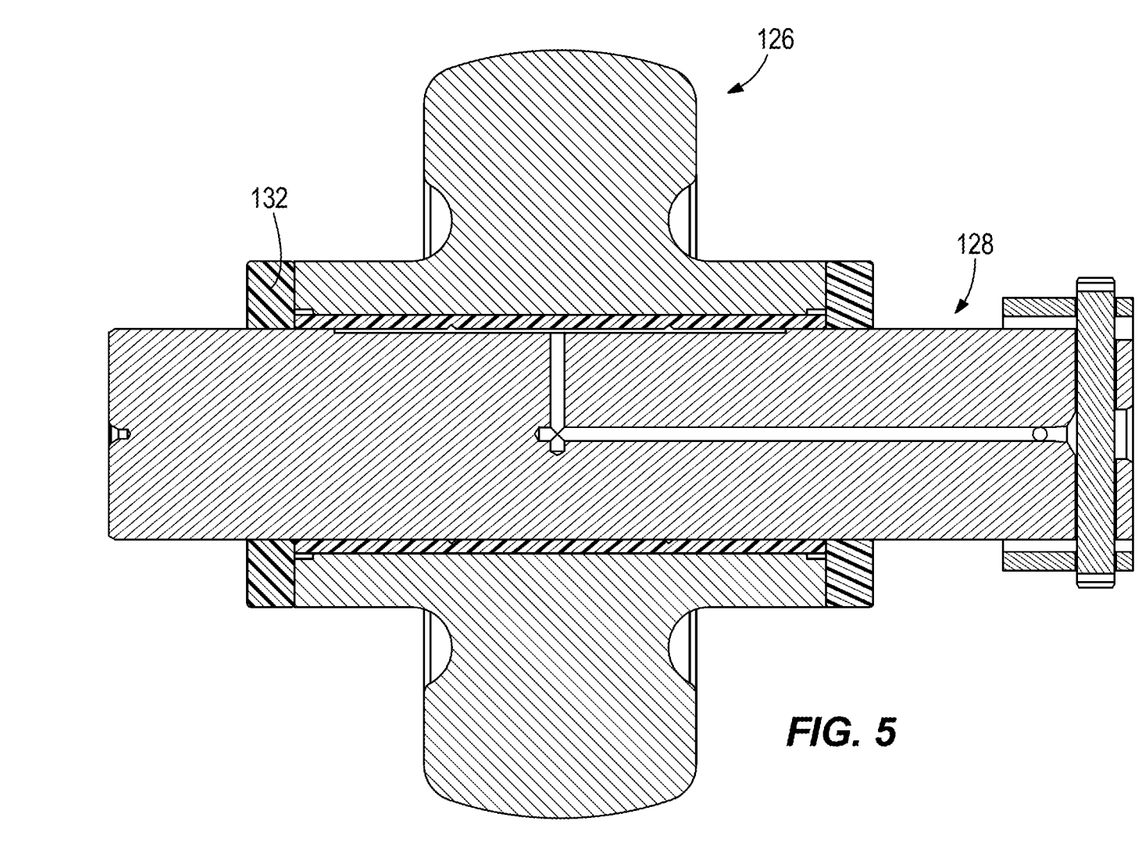
FIG. 5 is a section view of a roller viewed along section 5-5 of FIG. 4.

As shown in FIGS. 3 and 4, rollers 126 are rotatably coupled to the lower side 106 of the frame 90. The rollers 126 are aligned with one another such that all of the rollers 126 rotate in a common plane. Stated another way, the rollers 126 are aligned along a direction of travel 120 (FIG. 4) of the shoes 94. As shown in FIG. 5, each roller 126 is supported for rotation about a pin 128 defining an axis of rotation perpendicular to the direction of travel of the shoes 94. In the illustrated embodiment, a thrust washer 132 is positioned between the outer surface of the pin 128 and the inner bore of the 126.

Figure 6:
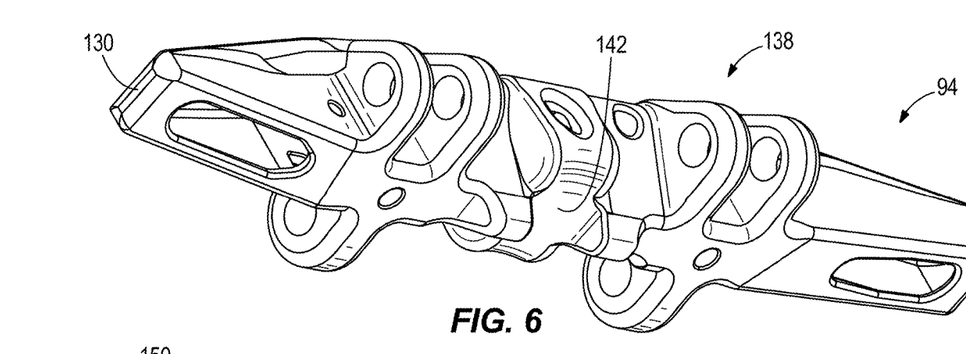
FIG. 6 is a perspective view of a crawler shoe.

Referring now to FIG. 6, each shoe 94 includes a first end 130, a second end 134, and an intermediate portion 138 positioned between the first end 130 and the second end 134. The shoes 94 are driven in a direction that is generally perpendicular to a line drawn between the first end 130 and the second end 134. The intermediate portion 138 includes a wear surface or roller path area 142 that contacts the rollers 126 as the shoes 94 are driven along the lower run of the track 92. The weight of the machine and any other loads supported by the machine 10 are transmitted through the rollers 126 to the shoes 94 in the lower run. In one embodiment, the compressive load exerted on the shoes 94 by the rollers 126 work hardens the shoes 94 at least during a predetermined period after installation of the shoes 94.

In one embodiment, the shoes 94 are formed from manganese or a manganese alloy and undergo a period of work hardening to increase the hardness of the shoes 94 to a desired level. In one embodiment, the contact between the rollers 126 and the roller path area 142 of each crawler shoe 94 work-hardens the shoe 94 during a period of operation after the shoe 94 is installed. The shoes 94 are work-hardened by the roller 126 where the primary loads are exerted, causing the shoes 94 to attain a higher hardness and thereby extending the overall life of the crawler 22 and its components. In one embodiment, the work hardening period for each shoe 94 takes place during the first 200-300 hours of operation on the crawler shoe 94.

Figure 7:
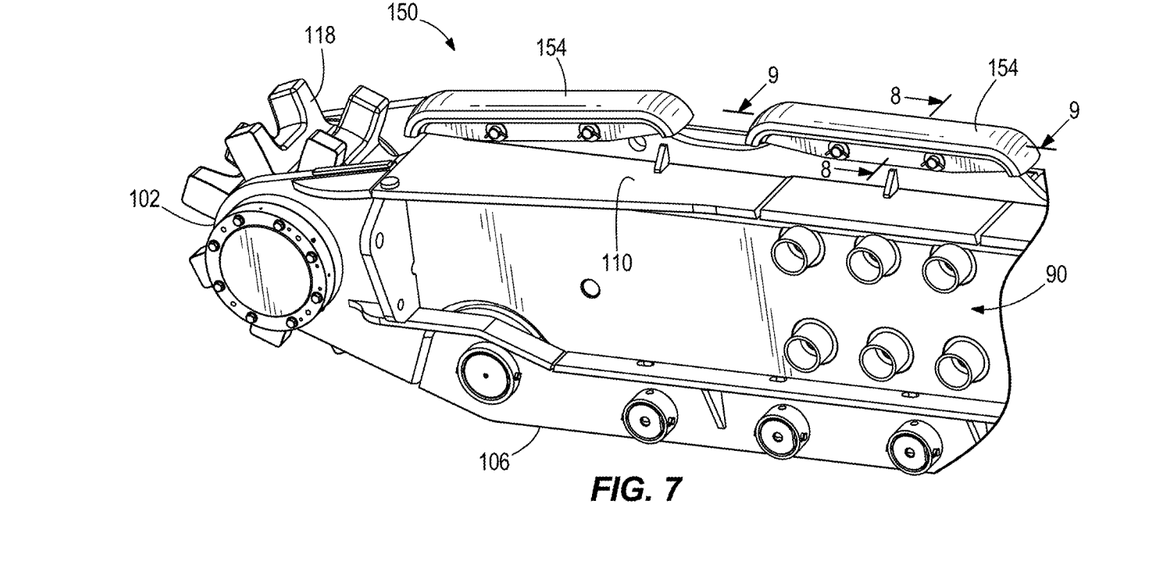
FIG. 7 is a perspective view of a portion of a track frame including a guide rail assembly.

FIG. 7 illustrates a guide rail assembly 150 extending along an upper portion 110 of the track frame 90. In the illustrated embodiment, the guide rail assembly 150 includes multiple rail portions 154. In one embodiment, the track frame 90 includes four rail portions 154. In other embodiments, the track frame 90 may include fewer or more rail portions 154, and the rail portions 154 may be coupled to the track frame 90 in a different manner. Each rail portion 154 has an elongated shape and is aligned such that a longitudinal axis of the rail portion 154 is parallel to the direction of travel of the shoes 94. Stated another way, the rail portions 154 are aligned in an end-to-end configuration such that all of the rail portions 154 extend along a common plane. In the illustrated embodiment, each rail portion 154 is independently coupled to the upper portion 110 of the track frame 90 (e.g., by a bolted connection) such that each rail portion 154 can be removed and replaced without requiring disassembly of any adjacent rail portions 154. In other embodiments, the guide rail assembly 150 may be coupled to the frame 90 in a different manner.

Figure 8:
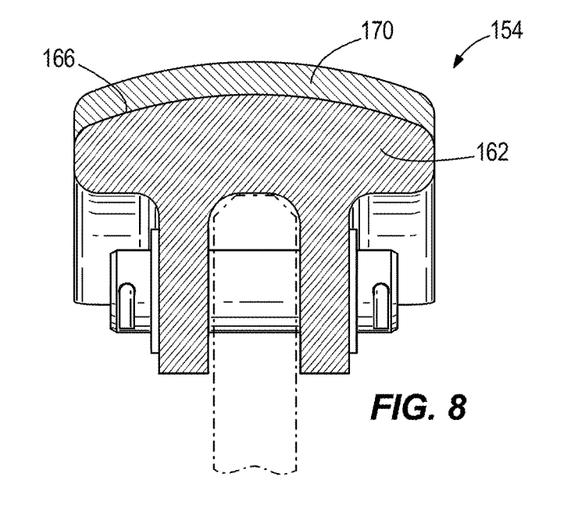
FIG. 8 is a section view of a guide rail portion viewed along section 8-8 of FIG. 7.
Figure 9:
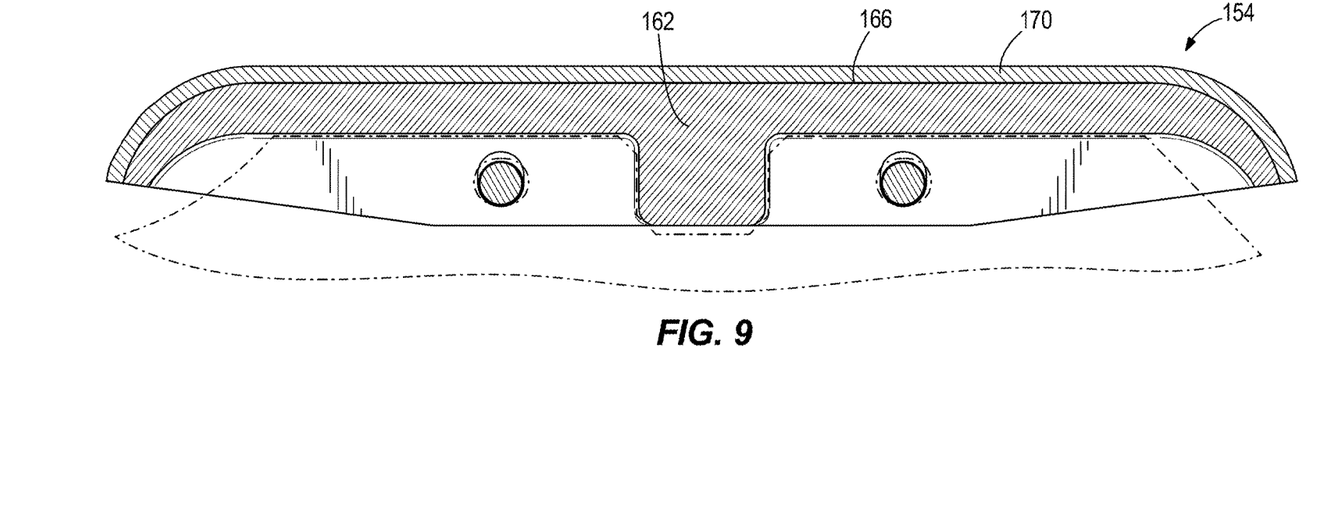
FIG. 9 is a section view of the guide rail portion viewed along section 9-9 of FIG. 7.

Referring now to FIGS. 8 and 9, each guide rail portion 154 includes a base 162 defining an outer surface 166 and a coating 170 coupled to the outer surface 166. In one embodiment, the coating 170 is a polymer-blend bonded to the outer surface 166, the coating 170 follows the same profile as the rail portion 154, and has a uniform, predetermined thickness. The coating 170 is bonded to the base 162 such that the bond is stronger than the coating 170 itself, and the coating 170 mimics the specialized profile of the base 162. In other embodiments, the coating 170 may also be attached mechanically by forming various features (e.g., small holes, recesses, and/or grooves) on the outer surface 166 in order to provide a stronger attachment between the coating 170 and the base 162.

In one embodiment, the coating 170 is formed from polyurethane. In one embodiment, the coating 170 is formed from KAS 311005D polyurethane. In one embodiment, the coating 170 is formed from Type 6M Nylon. In one embodiment, the coating 170 is formed from a Teflon polymer. In one embodiment, the coating 170 is formed from a polyurethane (which may include KAS 311005D) impregnated with a lubricative medium.

Referring again to FIG. 3, the guide rail assembly 150 engages the roller path area 142 of the shoes 94 as the shoes 94 are driven along the upper run of the track 92. The selection of the coating material at least partially depends on the loads and conditions to which the shoe 94 is subjected. The coating material provides a low coefficient of friction and lower hardness than the crawler shoe 94, even before the shoe 94 is completely work-hardened. The coating 170 provides lubricative engagement between the shoe 94 and the rail portion 154, reducing wear on the crawler shoe's roller path area 142 during the work-hardening period. The coating 170 has a life that matches or exceeds the work-hardening period such that, if the coating 170 were to wear off, the outer surface 166 of the base 162 would support the crawler shoes 94 after the shoes 94 have achieved a hardness exceeding the hardness of the base 162.

Furthermore, the coating 170 may be configured to significantly exceed the work-hardening period in order to decrease friction between the guide rail assembly 150 and the shoes 94, thereby facilitating more efficient operation of the track 92. In addition, many shoes 94 are also made of a manganese alloy having a similar hardness to the base 162 of the rail portions 154. Even after the shoe 94 is work-hardened, the wear rate of the shoe 94 is proportional to the hardness of the shoe 94 and the base 162 of the rail portion 154. Thus, providing a coating 170 having a lower hardness reduces the wear on the crawler shoe 94 and reduces the frequency of replacing shoes 94.

Figures 10, 11:
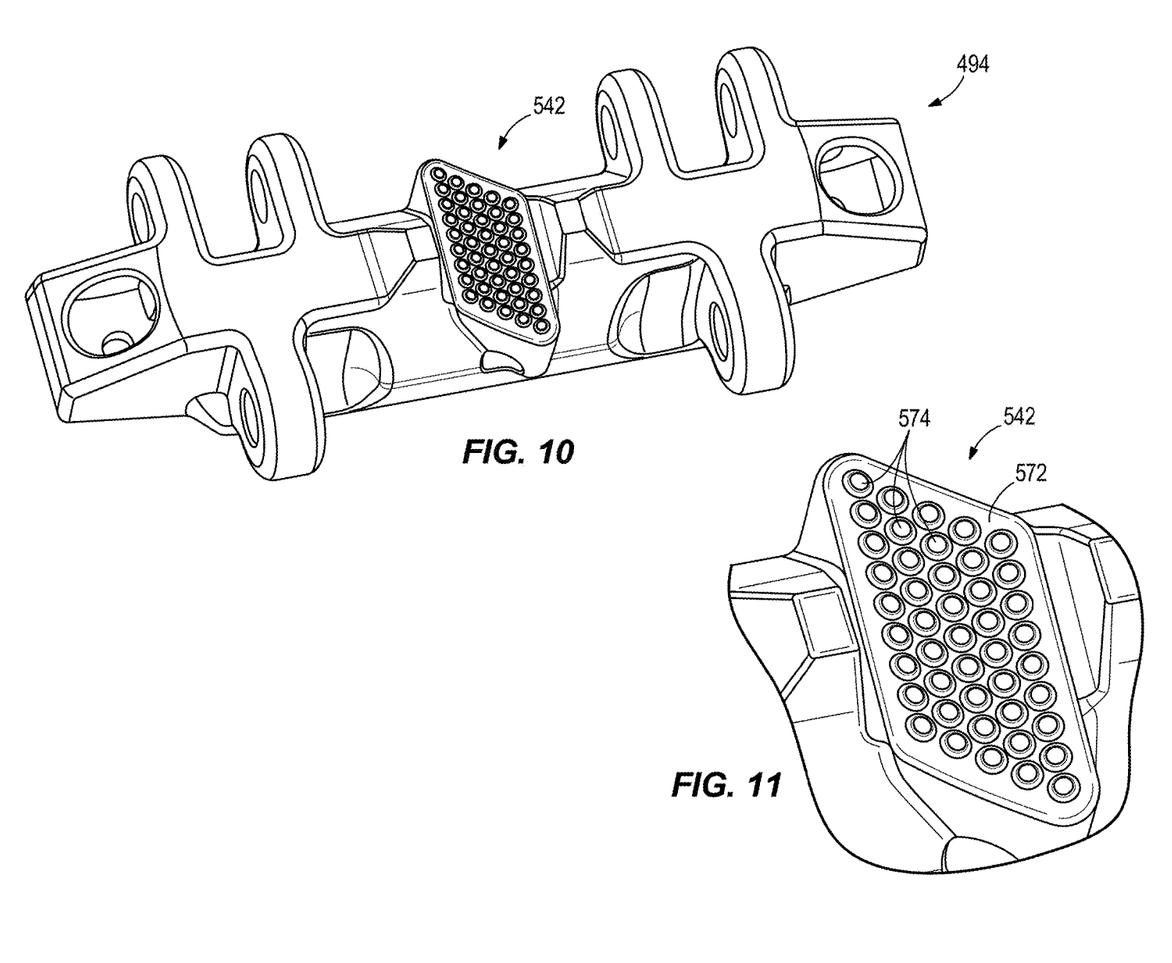
FIG. 10 is a perspective view of a crawler shoe according to another embodiment.
FIG. 11 is an enlarged perspective view of a portion of the crawler shoe of FIG. 10.

FIGS. 10 and 11 illustrate another embodiment of the shoe 494 in which the roller path area 542 includes a surface 572 (FIG. 11) and a plurality of peening pads or protrusions 574 (FIG. 11) extending outwardly from the surface 572. As the rollers 126 exert a compressive force on the roller path area 542, the protrusions 574 wear down, thereby facilitating material flow and work hardening of the shoe 494. In addition, the roller path area 542 is formed as a parallelogram, including a leading edge forming an acute angle relative to a front edge of the shoe 94 and a trailing edge parallel to the leading edge and forming an acute angle relative to a rear edge of the shoe 494. The structure of the shoe 494 is described in U.S. patent application Ser. No. 14/285,255, filed May 22, 2014, the entire contents of which is hereby incorporated by reference.

Figure 12:
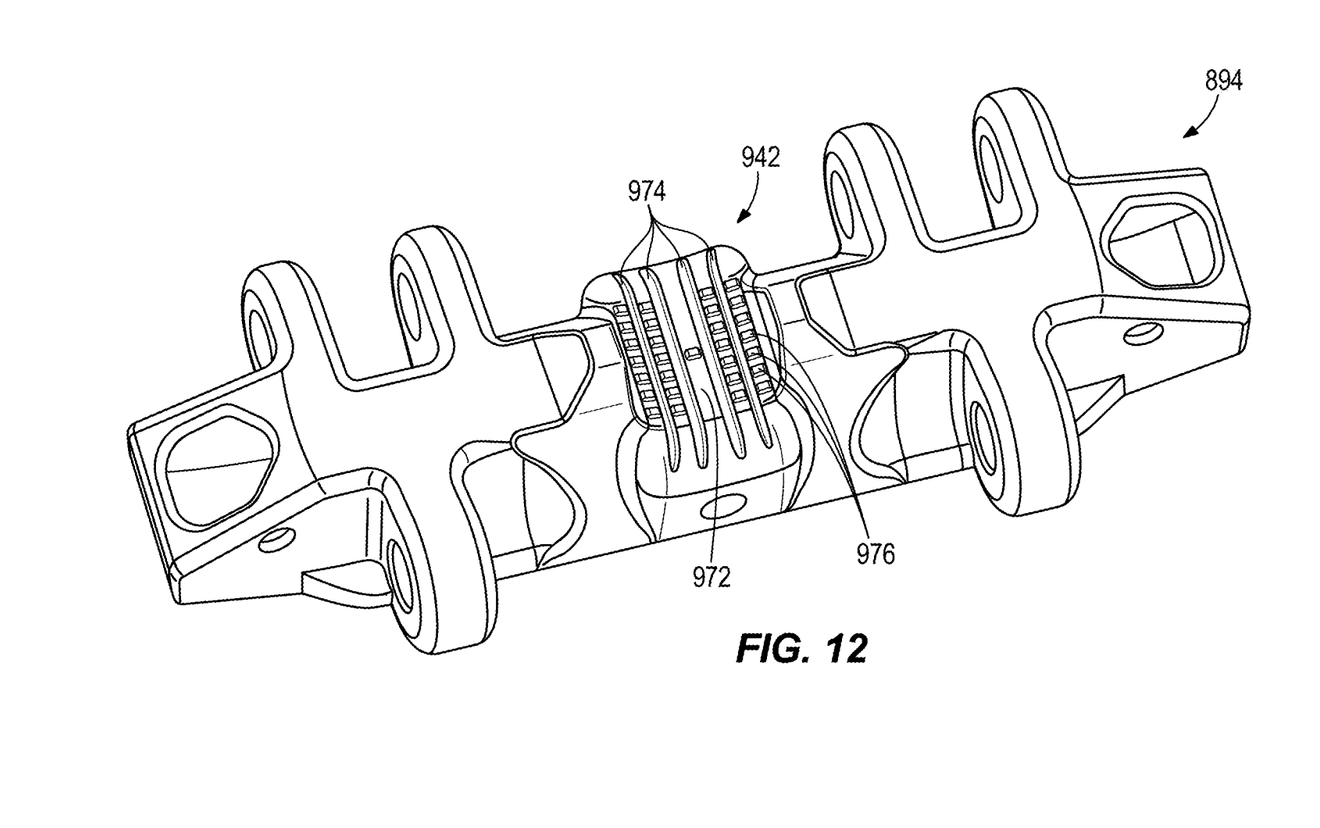
FIG. 12 is a perspective view of a crawler shoe according to another embodiment.

Similarly, FIG. 12 illustrates another embodiment of the shoe 894 in which the roller path area 942 includes a surface 972, ridges 974 extending outwardly from the surface 972 and parallel to the direction of travel, and protrusions 976 extending outwardly from the surface 972 and positioned between the ridges 974.

In other embodiments, a similar coating to the coating 170 on the guide rail assembly 150 may also be applied to the outer surface of the pins 128 (FIG. 5) supporting the rollers 126. In other embodiments, the thrust washer 132 between the pin 128 and the roller 126 may be formed from a nylon material.

Thus, the invention may provide, among other things, a guide rail for a crawler track. Although the invention has been described in detail with reference to certain independent embodiments, variations and modifications exist within the scope and spirit of one or more independent aspects of the invention as described.

What is claimed is:

1. A crawler track system comprising:
 a track including a plurality of shoes coupled together, the shoes configured to engage a sprocket to drive the track, each shoe including a first end, a second end, and a wear portion positioned between the first end and the second end, the wear portion having a shoe hardness; and
 at least one guide rail supporting the track over a portion of a path of the track, each guide rail including a base having an outer surface and a coating positioned on the outer surface, the outer surface of the base having a base hardness, the coating contacting the wear portion of each of the shoes as the shoes move along the portion of the track path, the coating having a coating hardness less than the shoe hardness,
 wherein the shoe hardness of each wear portion is initially less than the base hardness, and after a work-hardening period the shoe hardness of the wear portion is equal to or greater than the base hardness.

2. The crawler track system of claim 1, wherein the coating hardness and a thickness of the coating permit the coating to resist wear for at least the duration of the work-hardening period of the shoe.

3. The crawler track system of claim 1, wherein the coating is composed of polyurethane.

4. The crawler track system of claim 1, wherein at least a portion of the coating remains on the outer surface of the base for the duration of the work-hardening period of the plurality of shoes, the coating configured to wear away after the work-hardening period is completed.

5. The crawler track system of claim 1, wherein the wear portion of each shoe includes a wear surface and at least one protrusion extending outwardly from the wear surface, wherein wear experienced by the protrusion facilitates work hardening of the shoe.

6. The crawler track system of claim 1, further comprising a plurality of rollers supported for rotation and engaging the wear portion of each of the shoes as the shoes move along another portion of the track path, each of the rollers exerting a compressive force on the wear portion of each of the shoes, the compressive force causing work-hardening of the shoes during the work-hardening period.

7. The crawler track system of claim 6, wherein each of the rollers is supported for rotation by an associated pin aligned with an axis of rotation of the respective roller, the respective roller including an internal bore receiving the associated pin, the associated pin including an outer surface having a polymeric coating engaging the internal bore.

8. The crawler track system of claim 1, wherein the at least one guide rail includes a plurality of guide rails, the guide rails aligned with one another in an end-to-end configuration along a line parallel to the portion of the track path, each guide rail configured to be coupled to a frame independent of the other guide rails.

9. A crawler track system comprising:
 a track including a plurality of shoes coupled together, the shoes configured to engage a sprocket to drive the track, each shoe including a first end, a second end, and a wear portion, the wear portion having a shoe hardness; and
 at least one guide rail supporting the track over a portion of a path of the track, each guide rail including a base having an outer surface and a layer positioned on the outer surface, the outer surface of the base having a base hardness, the layer contacting the wear portion of each of the shoes as the shoes move along the portion of the track path, the layer having a layer hardness less than the shoe hardness,
 wherein the shoe hardness of each wear portion is initially less than the base hardness, and after a work-hardening period the shoe hardness of the wear portion is equal to or greater than the base hardness.

10. The crawler track system of claim 9, wherein the layer hardness and a thickness of the layer permit the layer to resist wear for at least the duration of the work-hardening period of the shoe.

11. The crawler track system of claim 9, wherein the layer is composed of polyurethane.

12. The crawler track system of claim 9, wherein at least a portion of the layer remains on the outer surface of the base for the duration of the work-hardening period of the plurality of shoes, the layer configured to wear away after the work-hardening period is completed.

13. The crawler track system of claim 9, wherein the wear portion of each shoe includes a wear surface and at least one protrusion extending outwardly from the wear surface, wherein wear experienced by the protrusion facilitates work hardening of the shoe.

14. The crawler track system of claim 9, further comprising a plurality of rollers supported for rotation and engaging the wear portion of each of the shoes as the shoes move along another portion of the track path, each of the rollers exerting a compressive force on the wear portion of each of the shoes, the compressive force causing work-hardening of the shoes during the work-hardening period.

15. The crawler track system of claim 14, wherein each of the rollers is supported for rotation by an associated pin aligned with an axis of rotation of the respective roller, the respective roller including an internal bore receiving the associated pin, the associated pin including an outer surface having a polymeric coating engaging the internal bore.

16. The crawler track system of claim 9, wherein the at least one guide rail includes a plurality of guide rails, the guide rails aligned with one another in an end-to-end configuration along a line parallel to the portion of the track path, each guide rail configured to be coupled to a frame independent of the other guide rails.

17. A method for work-hardening a crawler track including a plurality of shoes, each of the shoes including a wear portion, the method comprising:
providing a coating on an outer surface of at least one guide rail, the outer surface having a base hardness and the coating having a coating hardness;
driving the crawler track to move the shoes along a plurality of rollers and along the at least one guide rail, the rollers exerting a compressive force on each wear portion to work-harden each wear portion during a work hardening period, the work-hardening increasing a hardness of the wear portion from a first hardness less than the base hardness to a second hardness equal to or greater than the base hardness, the coating preventing direct contact between the wear portion and the outer surface of the guide rail for at least the duration of the work-hardening period.

18. The method of claim 17, wherein driving the crawler track includes driving the track beyond the work-hardening period, the coating configured to wear away after the work-hardening period is completed to permit direct contact between the wear portion and the outer surface of the guide rail.

19. The method of claim 17, wherein driving the crawler track causes the shoes to alternate between moving along the plurality of rollers and moving along the at least one guide rail.

* * * * *